July 21, 1964
H. W. DIETERT ETAL
3,141,515
AUTOMATIC WEIGHING DEVICE
Filed Aug. 31, 1960
4 Sheets-Sheet 1
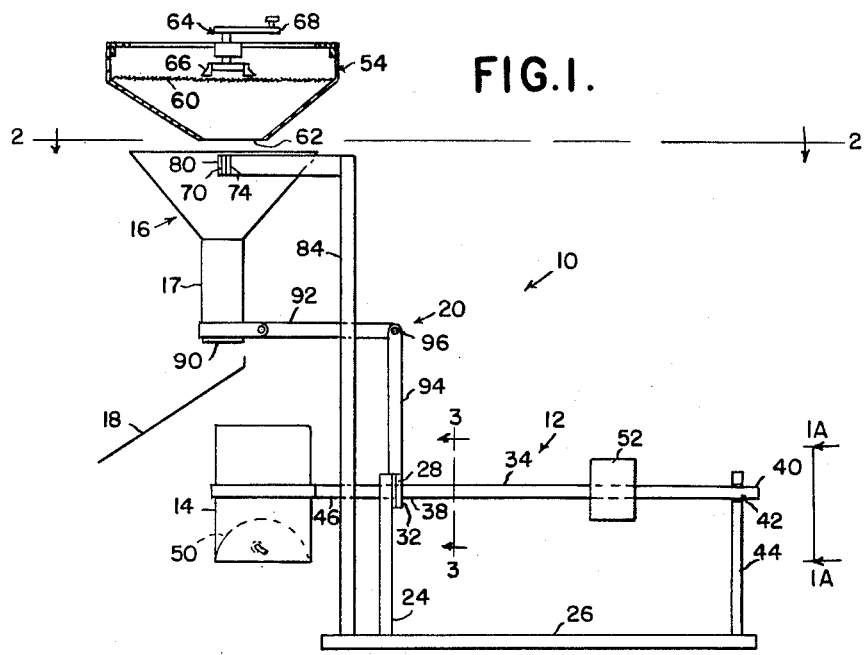
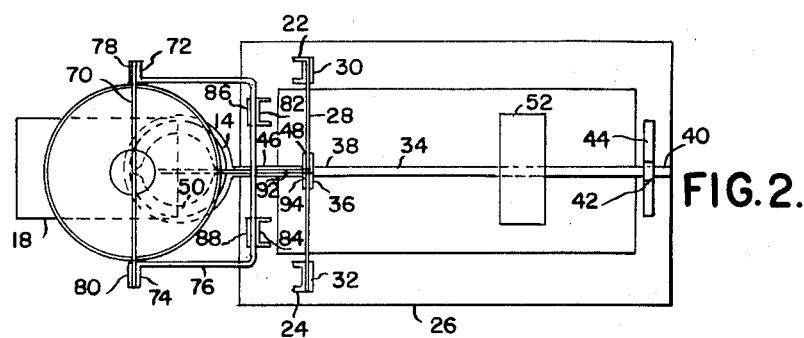
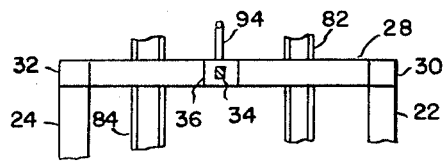
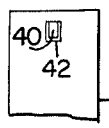
INVENTORS
HARRY W. DIETERT
BY ALBERT M. JONES
Whittemore, Hulbert & Belknap
ATTORNEYS July 21, 1964  H. W. DIETERT ETAL  3,141,515
AUTOMATIC WEIGHING DEVICE
Filed Aug. 31, 1960  4 Sheets-Sheet 2
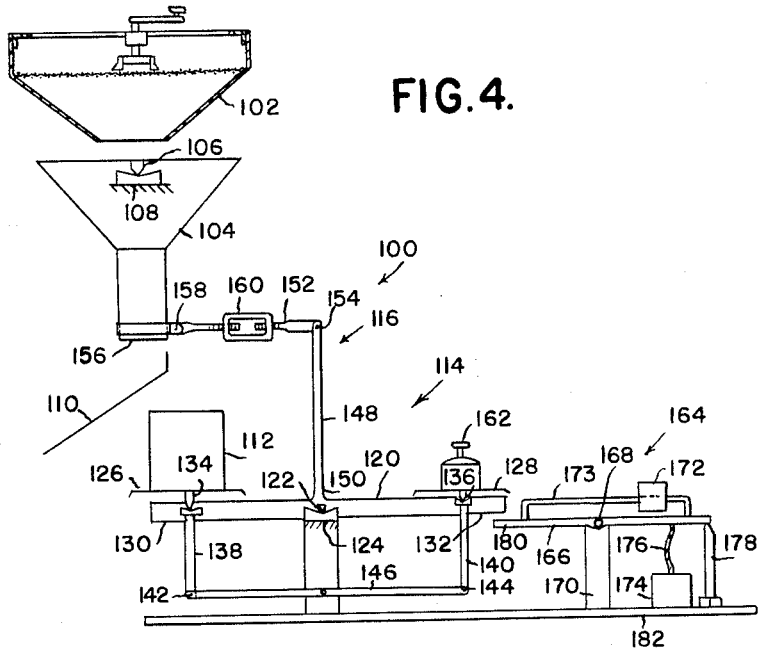
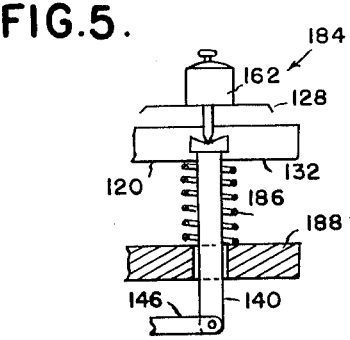
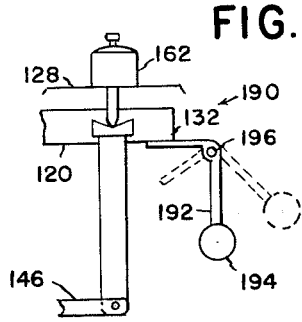
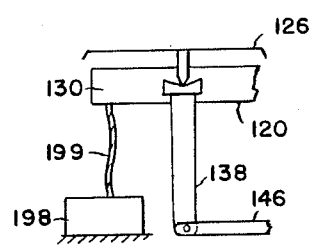
INVENTORS
HARRY W. DIETERT
ALBERT M. JONES
BY
Whittemore, Hulbert & Belknap
ATTORNEYS

INVENTORS
HARRY W. DIETERT
BY ALBERT M. JONES

ATTORNEYS

July 21, 1964   H. W. DIETERT ETAL   3,141,515
AUTOMATIC WEIGHING DEVICE
Filed Aug. 31, 1960   4 Sheets-Sheet 4

INVENTORS
HARRY W. DIETERT
BY ALBERT M. JONES

Whittemore, Hulbert & Belknap
ATTORNEYS

United States Patent Office

3,141,515
Patented July 21, 1964

3,141,515
AUTOMATIC WEIGHING DEVICE
Harry W. Dietert, Kerrville, Tex., and Albert M. Jones, Detroit, Mich., assignors to Harry W. Dietert Co., Detroit, Mich., a corporation of Michigan
Filed Aug. 31, 1960, Ser. No. 53,100
10 Claims. (Cl. 177—116)

The invention relates to an automatic weighing device and refers more specifically to apparatus for automatically separating a quantity of granular material of predetermined weight from a larger quantity of granular material.

An object of the invention is to provide automatic means for separating a predetermined weight of granular material from a larger amount of granular material.

Another object is to provide automatic means for separating a quantity of granular material from a larger quantity of granular material including means to prevent the quantity of granular material separated from exceeding a predetermined weight.

Another object is to provide an automatic weighing device for separating a predetermined weight of granular material from a larger quantity of granular material comprising weighing means, a container positioned on said weighing means, means for directing granular material into the container, and means positioned between the directing means and the container operable to prevent granular material from the directing means from passing into the container when the directing means is in a particular position, and means for moving the directing means into said particular position when the predetermined weight of granular material is in the container as indicated by said weighing means.

Another object is to provide an automatic weighing device as set forth above wherein the means for moving the directing means comprises a mechanical linkage between the weighing means and said directing means.

Another object is to provide an automatic weighing device as set forth above wherein the means for moving the directing means is electronically controlled in response to movement of the weighing means.

More specifically it is an object to provide an automatic weighing device comprising a balance beam supported on a frictionless pivot and including an adjustable weight on one side of the frictionless pivot and a container on the other side thereof, a funnel also supported on a frictionless pivot positioned above the container adapted to receive granular material and to discharging the granular material into the container with the funnel in predetermined positions, a chute positioned between the container and funnel to receive granular material discharged from the funnel in other positions of the funnel, and a mechanical linkage secured to the balance beam and funnel operable to move the funnel between said predetermined positions and other positions in accordance with the position of the balance beam.

More specifically it is an object to provide an automatic weighing device comprising a balance including a pivotally mounted balance beam having a pan at each end thereof, one of which is adapted to receive a container, the other pan being adapted to receive a predetermined weight thereon, a funnel pivotally mounted to discharge granular material placed therein into the container in predetermined positions of the funnel, a chute located between the funnel and container, said funnel being positioned to discharge granular material onto said chute in other positions of said funnel, and a mechanical linkage secured at one end to the balance beam and at the other to the funnel for moving the funnel into said predetermined and other positions in accordance with the position of the balance beam.

Another object is to provide an automatic weighing device as set forth above wherein the means for positioning the funnel in accordance with the position of the balance beam comprises electronic means including a linear variable differential transformer secured to the balance beam, an amplifier and servo-motor operable in response to an electric signal developed by the transformer, and a mechanical linkage between the servo-motor and the funnel.

Another object is to provide an automatic weighing device as set forth above including means to compensate for the effect of the weight on the balance beam when the balance beam is out of balance so that the weight of granular material deposited in the container will not exceed a predetermined desired weight due to rapid discharge of granular material into the container as the balance beam approaches a balanced condition.

Another object is to provide an automatic weighing device as set forth above wherein the compensating means comprises a second balance beam having a variable weight positioned thereon and a fixed weight secured thereto by means of a flexible linear member and a stop against which the second balance beam abuts immediately prior to balancing of the first balance beam having the weight and container thereon.

Another object is to provide an automatic weighing device as set forth above wherein said compensating means comprises a compression spring positioned beneath the end of the balance beam supporting the weight which spring is operable to act in opposition to the weight before the balance beam reaches a balanced position.

Another object is to provide an automatic weighing device as set forth above wherein the compensating means comprises a weighted bell crank lever operable to act in opposition to the weight supported by said balance beam when the beam is in an unbalanced condition.

Another object is to provide an automatic weighing device as set forth above wherein the compensating means comprises a weight secured to the end of the balance beam supporting the container by means of a flexible linear member.

Another object is to provide an automatic weighing device as set forth above wherein the compensating means comprises a second linear variable differential transformer connected in a null balance circuit with the previously mentioned linear variable differential transformer which second transformer is carried by a separate balance beam and the core of which is positioned by means of a cam operated by the funnel positioning servo-motor.

Another object is to provide an automatic weighing device as set forth above including means to prevent oscillation of the balance beam after sufficient material has been discharged into the container to balance the balance beam.

Another object is to provide an automatic weighing device as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a side view of an automatic weighing device in accordance with the invention.

FIGURE 1A is an enlarged partial end view of the automatic weighing device illustrated in FIGURE 1 taken substantially on the line 1A—1A in FIGURE 1.

FIGURE 2 is a view of the automatic weighing device illustrated in FIGURE 1 taken on the line 2—2 in FIGURE 1.

FIGURE 3 is a partial sectional view of the automatic weighing device of the invention taken on the line 3—3 in FIGURE 1.

FIGURE 4 illustrates a modification of the automatic weighing device of the invention including means to compensate for the effect of the weight on the balance beam before a balanced condition of the balance beam is reached.

FIGURES 5, 6 and 7 illustrate modifications of the compensating means of the automatic weighing device shown in FIGURE 4.

Figure 8:
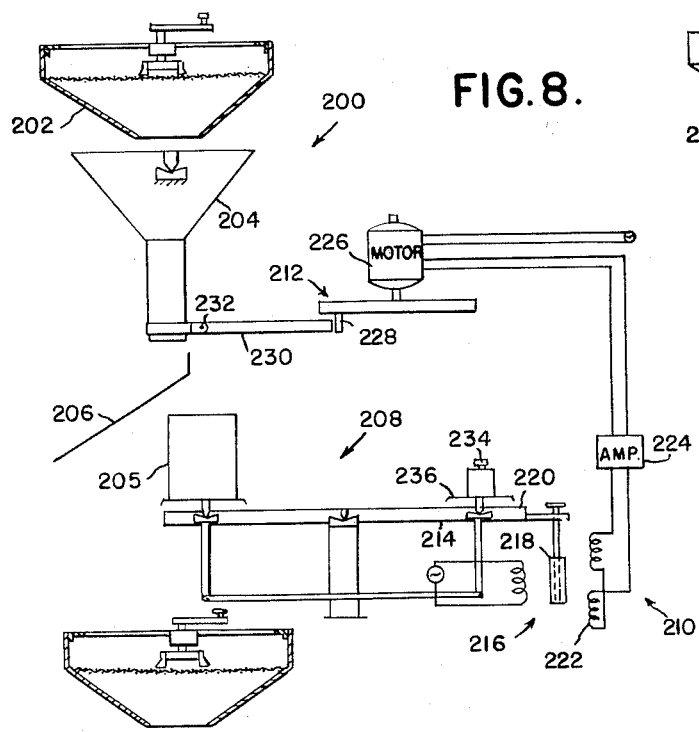
FIGURE 8 is a modification of the automatic weighing device illustrated in FIGURE 4 wherein electronic means are used to control the position of the funnel in accordance with the position of the balance beam.

With reference to the drawings an embodiment of the invention will now be disclosed.

The embodiment of the automatic weighing device 10 of the invention illustrated in FIGURES 1–3 comprises weighing means 12 including a container 14 at one end thereof and means 16 for feeding granular material into the container 14 when the weighing means 12 is in an unbalanced condition including a funnel 17 for directing the discharge from means 16. A chute 18 is positioned between the container 14 and the funnel 17 to receive granular material discharged from the means 16 when the weighing means is in a balanced condition.

The automatic weighing device 10 of the invention further includes a mechanical linkage 20 between the funnel 17 and the weighing means 12. The mechanical linkage 20 is operable to position the funnel 17 to discharge granular material into the container 14 when the weighing means is in an unbalanced condition and to position the funnel 17 for discharging the granular material onto the chute when the weighing means is in a balanced condition.

More specifically the balance 12 comprises posts 22 and 24 rigidly secured in a vertical position to base 26. The posts 22 and 24 support a resilient band 28 which may be of spring steel for example between the ends thereof. Plates 30 and 32 are provided to aid in securing band 28 to the posts 22 and 24.

A balance beam 34 is secured to the resilient band 28 centrally thereof by means of plate 36 secured to end 38 thereof. End 40 of the balance beam 34 extends through a slot 42 in a vertical suport 44 rigidly secured to the base 26 as shown.

Container 14 is supported by a continuation 46 of balance beam 34 which is connected to the resilient band 28 by means of plate 48. The container 14 is open at the top, as shown in FIGURE 1, for reception of granular material and includes means such as the expandable balloons 50 for closing the bottom therreof when it is desired to retain granular material therein.

Thus with a weight 52 adjustably positioned on balance beam 34, as shown best in FIGURES 1 and 2, the resilient band 28 serves as a frictionless pivot, the cross section of which will be rotated clockwise with respect to FIGURE 1 if the weight 52 is positioned to overbalance the contents of the container 14 and counterclockwise if the contents of the container 14 overbalance the weight 52. If the weight 52 exactly balances the weight of the contents of the container 14 the cross section of the band 48 will be vertical as shown in FIGURE 1. The weight of granular material in container 14 which will cause the weighing device 10 to be in balanced condition will of course depend upon the position of the weight 52 along the weight of the balance beam 34.

The means 16 for discharging granular material into the container 14 includes the feed hopper 54 and the pivotally mounted funnel 17 positioned relative to container 14 as shown in FIGURE 1. Feed hopper 54 is shaped as shown and has an opening 62 in the bottom thereof. A screen 60 forms a partition across the hopper 54 as shown in FIGURE 1. An agitator 64 having resilient paddles 66 secured thereto is supported within hopper 54 and is provided with crank means 68. In operation granular material positioned in hopper 54 on screen 60 is agitated and caused to pass through screen 60 and out of the opening 62 in the bottom of the hopper 54 and into funnel 17.

Funnel 17 as shown is rigidly supported on resilient band 70 which may be spring steel to provide frictionless pivot support for funnel 17 with respect to yoke 76. The resilient band 70 is tensioned between the ends 72 and 74 of yoke 76 to which it is secured by means of plates 78 and 80. The yoke 76, as illustrated best in FIGURES 1 and 2, is secured to vertical posts 82 and 84 by means of plates 86 and 88. Thus the funnel 17 may be pivoted in a vertical plane about the longitudinal axis of the band 70 to position the discharge end 90 thereof over the container 14 or the chute 18.

Chute 18 is positioned between the funnel 17 and the container 14 by convenient means (not shown). Chute 18 is provided to receive granular material discharged from the end 90 of the funnel 17 when the container 14 contains granular material sufficient in weight to balance the weight 52 and the weighing means 12 is in a balanced condition.

Mechanical linkage 20 comprises a link 92 pivotally secured to the end 90 of the funnel 17, as shown best in FIGURE 1, and a link 94 rigidly secured to the resilient band 28. The link 94 is thus caused to move angularly with the band 28 on twisting of the band due to an unbalance of weighing means 12. With the granular material in the container 14 and the weight 52 in balance the link 94 will be positioned vertically as shown in FIGURE 1. Link 94 is pivoted to link 92 by pivot means 96 as shown in FIGURE 1 whereby on movement of link 94 with band 28 funnel 17 is caused to pivot about band 70.

Thus in operation when it is desired to separate a quantity of granular material having a predetermined weight from a larger quantity of granular material, the weight 52 is first moved to a position on balance beam 34 wherein it will just balance the desired weight of granular material if the desired weight of granular material is placed in container 14. This positioning of the weight 52 will cause rotation of the band 28 in a clockwise direction whereby link 94 will move clockwise to cause the open end 90 of funnel 17 to move to the right in FIGURE 1 whereby granular material discharged therefrom will fall into the container 14.

The inflatable balloons 50 in container 14 are inflated to close the bottom of the container 14, the granular material is placed in the feed hopper 54 and is agitated so that it is passed through screen 60, out of opening 62 of the hopper 54 and into the pivotally supported funnel 17.

The granular material then passes out of the open end 90 of funnel 17 and into the container 14. As the granular material is deposited in the container 14 the weight thereof will cause the band 28 and link 94 to progressively move in a counterclockwise direction whereby funnel 17 is pivoted about the band 70 so that the open end 90 thereof is progressively positioned more over the chute 18 and less over the container 14. Thus the continued filling of the container 14 is carried on at a progressively slower rate while a progressively larger amount of the granular material passing through the open end 90 of the funnel 17 is deposited on the chute 18.

When the predetermined weight of granular material is in the container the open end 90 of the funnel 17 is in the position shown in FIGURE 1 and all of the granular material which is discharged from the funnel 17 is deposited on the chute 18. The weighing means 12 is in a balanced condition at this time. If desired the balloons 50 in the container 14 may then be deflated and the granular material removed from container 14 after which the weighing cycle may be repeated.

Thus it can be seen that in accordance with the invention there is provided a simple, efficient automatic weighing device which is particularly adapted due to the frictionless pivot means used therein for use in foundries or other installations where conditions such as the presence of large quantities of extremely fine loose material are found which are detrimental to weighing means using friction pivot means. The frictionless bands 28 and 70 are uneffected by collection of dust and the like thereon.

A modification 100 of the automatic weighing device 10 is illustrated in FIGURE 4. The automatic weighing device 100 comprises means for feeding granular material into a container 112 including a feed hopper 102 which is the same as feed hopper 54 and a funnel 104. Funnel 104 is supported by pivot means 106 on fixed supports 108 for movement into positions over chute 110 and container 112 as shown in FIGURE 4.

Weighing means 114 includes balance beam 120 supported by pivot means 122 on fixed supports 124. Pans 126 and 128 are provided at ends 130 and 132 of balance beam 120. Pans 126 and 128 are supported by pivot means 134 and 136 respectively on posts 138 and 140 which are pivotally connected by pivot means 142 and 144 respectively to the pivotally mounted connecting rod 146 in the well known manner of such weighing means.

As the link 94 the link 148 of a mechanical linkage 116 is rigidly secured to the balance beam 120 at end 150 and is pivotally secured to the link 152 by pivot means 154. Link 152 is pivotally connected by pivot means 158 to the open end 156 of the funnel 104. Means such as turnbuckle 160 are provided in link 152 to adjust the position of the open end 156 of the funnel 104 with respect to the chute 110 and the container 112 so that with the link 148 vertical as shown in FIGURE 4, when the weighing means 114 is in a balanced condition all of the granular material discharged from the funnel 104 will be deposited on the chute 110.

The operation of the modification 100 of the automatic weighing device of the invention which is illustrated in FIGURE 4 should now be obvious from the description of the operation of the automatic weighing device 10 illustrated in FIGURES 1–3. In the operation of the modification 100 however there is a tendency for too much granular material to be deposited in the container 112 before the balance beam 120 reacts sufficiently thereto to position the open end 156 of the funnel 104 over chute 110. Therefore means are provided in the automatic weighing device 100 to compensate for the tendency thereof to provide a weight of granular material which is in excess of the weight 162 positioned on the span 128.

The compensating means 164 shown in FIGURE 4 comprises a second balance beam 166 supported by pivot means 168 on post 170. A weight 172 is provided and is adjustable along the length of the balance beam 166 on rod 173 mounted on the balance bear 166. Weight 172 is operable in conjunction with a weight 174 secured to the balance beam 166 by means of a flexible linear member 176 as shown in FIGURE 4 to counteract the effect of the weight 162 on the balance beam 120 when the weight of the granular material in the container 112 is not sufficient to balance the weight 162. Adjustable stop 178 is provided in conjunction with the balance beam 166 to prevent weights 172 and 174 from counteracting the weight 162 placed in pan 128 on balance beam 120 when the weight of the granular material in the container 112 closely approaches the weight necessary to balance weight 162.

Thus in operation before any granular material is placed in container 112 and with the weight 162 on pan 128 the balance beam 120 is caused to rotate clockwise about pivot means 122 whereby balance beam 166 is caused to rotate counterclockwise about pivot point 168 due to contact between end 180 thereof and end 132 of balance beam 120. Weight 174 is thus listed from the support 182 and with weight 172 tends to rotate the balance beam 166 in a clockwise direction in opposition to weight 162.

As granular material is placed in container 112 the combined weight of the granular material in the container 112 and the weights 172 and 174 counteract the weight 162 to such an extent that the balance beam 120 is rotated counterclockwise to reduce the flow of granular material from the funnel 104 into the container 112 and to increase the flow of granular material onto the chute 110 in the manner previously considered and to eventually reposition weight 174 on support 182. As the weight of the granular material in the container 112 approaches the value necessary to balance weight 162 the combined weight of the granular material in the container 112 and the weight 172 causes the balance beam 120 to move in a counterclockwise direction and to rotate balance beam 166 in a clockwise direction into contact with stop 178. As balance beam 166 contacts stop 178 the final balancing of the weight 162 is accomplished only by means of the granular material in the container 112.

Thus it will be seen that the compensating means 164 permits placing of granular material in container 112 of the automatic weighing device 100 without the danger of granular material being deposited in th econtainer 112 at such a rapid rate that objectionable additional granular material is added to the container 112 after granular material having a weight sufficient to balance weight 162 has been placed in the container 112.

The compensating means 184 shown in FIGURE 5 operates in the same manner as the compensating means 164 illustrated in FIGURE 4. Compensating means 184 comprises resilient means 186 positioned around post 140 between the end 132 of balance beam 120 and a fixed surface 188. Spring 186 is thus operable to counteract the weight 162 placed on pan 128 until the balance beam 120 reaches a nearly balanced condition at which time resilient means 186 due to the length thereof is no longer active to counteract the weight 162.

Compensating means 190 illustrated in FIGURE 6 is similar in operation to compensating means 164 and 184 in that the bell crank lever 192 having weight 194 on one end thereof and pivotally mounted at 196 operates to exert an upward force on the end 132 of balance beam 120 to counteract the weight 162 placed in pan 128 until the weight 94 reaches the lowest position at which time the balance beam 120 is very close to a balanced condition.

In FIGURE 7 the weight 198 supported by a flexible linear member 199 from end 130 of balance beam 120 may also be used to compensate for the effect of weight 162 on the balance beam 120 to prevent excess granular material from being fed into container 112 as will be understood by those in the art.

A modification 200 of the automatic weighing device 100 illustrated in FIGURE 4 is shown in FIGURE 8. The modification 200 comprises a feed hopper 202, pivotally supported funnel 204, container 205, chute 206 and measuring means 208 entirely similar to the feed hopper 102, funnel 104, chute 110 and measuring means 114 shown in FIGURE 4. Electronic control means 210 for actuating mechanical adjusting means 212 operable to position the funnel 204 in accordance with the position of the balance beam 214 is provided in the automatic weighing device 200 in place of the mechanical linkage 116 of the automatic weighing device 100.

The electronic control means illustrated in FIGURE 8 comprises a linear variable differential transformer 216 having the core 218 secured to the end 220 of balance beam 214 for movement therewith. The secondary windings 222 of the transformer 216 are operable to produce an electric signal which is proportional in magnitude and sine to the amount and direction of movement of core 218. In accordance with the invention the signal developed in the secondary windings 222 of the transformer 216 are amplified in servo-amplifier 224 and are used to operate servo-motor 226. The operation of servo-amplifier 224 and servo-motor 226 are well known in the art and will not be described in detail here.

The mechanical means for positionnig funnel 204 in accordance with the electric signal developed by the transformer 216 comprises a cam 228 positioned by rotation of servo-motor 226. Cam 228 is operable to position funnel 204 through link 230 pivotally secured to the funnel 204 by pivot means 232.

In operation the electronically controlled mechanical positioning means for funnel 204 of the automatic weighing device 200 has been found to require compensation for a weight 234 positioned on pan 236 on balance beam 214 to prevent the granular material deposited in the container from having a weight greater than a predetermined weight as has previously been indicated. Thus electronic compensating means 238 illustrated in FIGURE 9 is provided for use in conjunction with the automatic weighing device illustrated in FIGURE 8.

Figure 9:
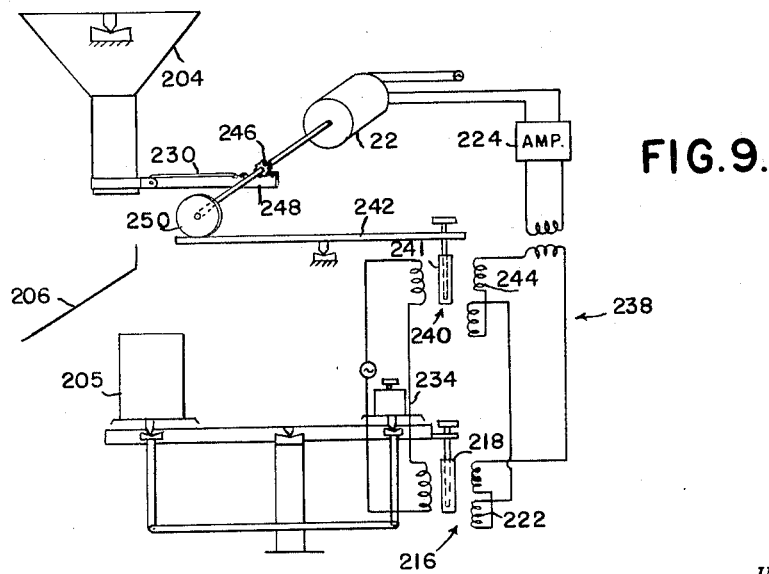
FIGURE 9 illustrates compensating means for the modified automatic weighing device illustrated in FIGURE 8 for insuring that the weight of granular material discharged from the funnel into the container is the same as the weight positioned on the balance beam.

The electronic compensating means 238 as illustrated in FIGURE 9 comprises a second linear variable differential transformer 240 having a core 241 secured to a second balance beam 242 for movement therewith and having secondary windings 244 which are connected in an aural null circuit with the secondary windings 222 of the previously indicated transformer 216 so that when the cores of both of the transformers 216 and 240 are moved similarly no output is provided therefrom for amplifier 224.

Thus in operation on a large movement of the balance beam 214, for example as when a weight 234 is positioned thereon, a large signal will be sent to amplifier 224 from the transformer 216 which will cause operation of the servo-motor 226 to position the funnel 204 by means of pinion 246 and rack 248 on the end of link 230 and to simultaneously position the balance beam 242 by means of cam 250 to adjust the position of the core 241 of the transformer 240 to counter-balance the movement of the core 218 of transformer 216 which effectively counterbalances the weight 234 placed in pan 236 as the weighing means approaches a balanced condition as before.

Figure 10:
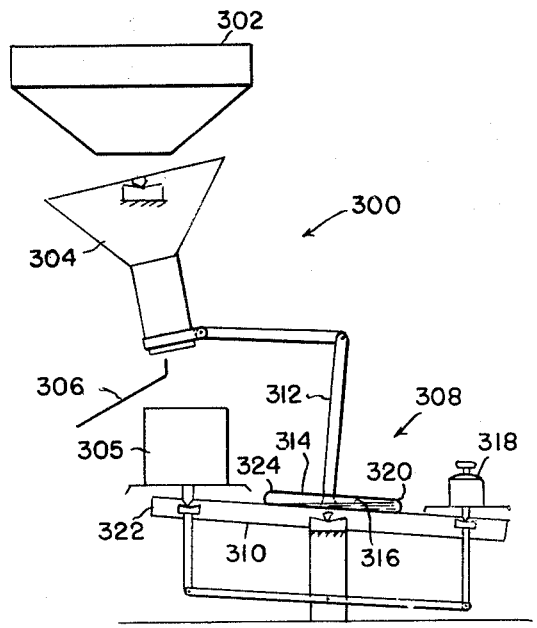
FIGURE 10 is a modification of the automatic weighing device illustrated in FIGURE 4 wherein liquid filled tube means is provided to prevent oscillation of the balance beam after sufficient material has been deposited in the container to balance the balance beam.

A second modificaion 300 of the automatic weighing device 100 illustrated in FIGURE 4 is shown in FIGURE 10. The modification 300 comprises the feed hopper 302, pivotally supported funnel 304, container 305, chute 306 and measuring means 308 entirely similar to the feed hopper, funnel, chute and measuring means shown in FIGURE 4.

The measuring means 308 illustrated in FIGURE 10 includes the balance beam 310 and link 312. In addition the measuring means 308 illustrated in FIGURE 10 includes the hollow tube 314 filled with a heavy liquid 316, such as mercury. The function of the mercury filled tube is to prevent oscillation of the balance beam 310 when the material deposited in the container 305 is sufficient to balance the balance beam.

In operation the automatic weighing device 300 is in the position shown in FIGURE 10 at the start of the filling of the container 305. The link 312 is at this time tilted clockwise as previously indicated, while the weight 318 is in a lower position relative to the postion of the container than when the automatic weighing device is balanced. At this time the liquid 316 in the tube 314 is primarily at end 320 thereof due to the clockwise rotation of the balance beam 310 on which it is centrally mounted in axial alignment as shown.

As granular material is added to the container 305 the weight on the left end 322 of the balance beam 310 will increase until the balance beam 310 is balanced at which time the continer 305 will tend to lower while the weight 318 will be raised. Due to the physical characteristics of the weighing device, such as inertia and friction, the balance beam 310 will over-shoot a balanced position in its counterclockwise rotation and oscillating of the balance beam 310 normally results, causing undesirable addition of granular material to the container 305. With the provision of the liquid filled tube however the balance beam of the automatic weighing device 300 illustrated in FIGURE 10 will not be permitted to oscillate.

Figure 11:
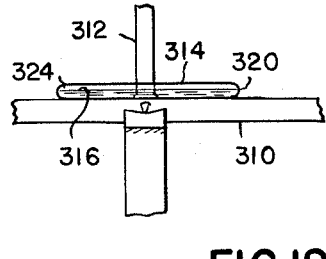
FIGURES 11 and 12 are partial views of the modification of the weighing device of the invention illustrated in FIGURE 10 showing the liquid filled tube in successive positions during a weighing cycle.
Figure 12:
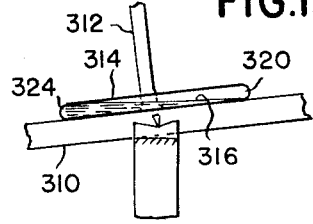

As the balance beam 310 starts to pivot counter-clockwise on the granular material within the container 305 reaching a predetermined weight sufficient to cause balancing of the balance beam 310, the liquid 316 in the tube 314 will first assume a level condition as shown in FIGURE 11. The balance beam passes through a horizontal balanced position and the liquid will thereafter on continued counter-clockwise rotation of the balance beam collect at end 324 of the tube 314 as shown in FIGURE 12. The balance beam is thus locked in an overbalanced counter-clockwise position wherein all of the granular material from funnel 304 is fed to chute 306.

Figures 13, 14:
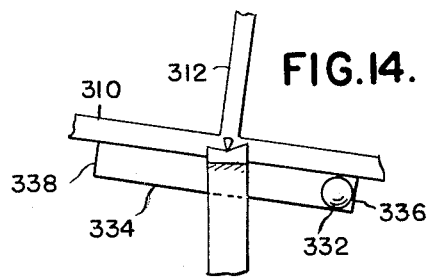
FIGURES 13 and 14 are partial views of the automatic weighing device illustrated in FIGURE 10 showing modifications of the means for preventing oscillation of the balance beam.

Alternative means for producing the same result as the liquid filled tube are illustrated in FIGURES 13 and 14. In FIGURE 13 there is shown a weight 326 secured by means of bracket 328 to link 312 in a position so that the center of gravity thereof is slightly to the left of a vertical line 330 through the pivot axis of the balance beam 310 with the balance beam in the fully clockwise position thereof as shown in FIGURE 10. It will be understood that on pivoting of the balance beam 310 in the counter-clockwise direction the center of gravity of the weight 326 will be moved to the left of the line 330 in which position the weight 326 serves to prevent the balance beam 310 from oscillation.

In FIGURE 14 a ball weight 332 is mounted in the track 334 beneath the balance beam 310. When the balance beam 310 is at a limiting clockwise position the weight 332 is at the end 336 of the track 334. On counter-clockwise rotation of the balance beam 310 due to the weight of the granular material in the container 305, the weight 332 is caused to move by gravity to the end 338 of track 334 to again prevent oscillation of the balance beam 310 after it has once passed through the balanced position thereof during a weighing cycle.

While one embodiment of the invention and the details of specific modifications thereof have been disclosed it will be understood that the invention is not limited to such embodiment or the exact details thereof.

Figure 15:
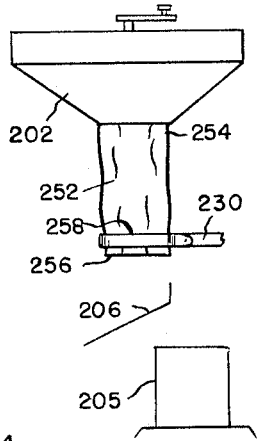
FIGURE 15 illustrates a modification of the means illustrated in FIGURE 8 for feeding granular material into the container.

For example, instead of using a pivoted funnel 204 for feeding material to be weighed into the container 205, as shown in FIGURE 8, a flexible tube 252 having end 254 secured to the feed hopper 202, the other end 256 of which is held in variable positions with respect to the container 206 by collar 258 secured to link 230, as shown in FIGURE 15 may be used to feed the material to be weighed into the container 205.

Similarly while it has been indicated that the means for feeding the granular material into the container, such as the funnel 204 or the flexible hose 252, are variably positionable to determine the amount of material deposited in the containers associated therewith, it will be understood that the intermediate means such as the chutes 206 may be the members which are moved to determine the amount of material discharged from the funnel 204 or flexible hose 252 which is fed into the container.

Further it will be obvious to those in the art that the intermediate means, such as the chute 206 could be omitted and the discharge opening of the means for feeding material into the container variably positioned over the edge of the container in response to the weighing means to deposit in the container different proportions of the material discharged from the means for feeding material into the container.

All such modifications of the automatic weighing device disclosed which suggest themselves to a skilled mechanic are intended to be included within the scope of the invention.

The drawings and the foregoing specification constitute a description of the improved automatic weighing device in such full, clear, concise and exact terms as to enable any person skilled in the art to practice the invention, the scope of which is indicated by the appended claims.

What we claim as our invention is:

1. An automatic weighing device comprising a pivotally supported substantially straight rigid balance beam having a container on one end thereof, means constraining the other end of said balance beam against other than axial movement, a weight variably positionable on said balance beam for balancing material deposited in said container, means for feeding material into said container, intermediate means positioned between the feeding means and said container for intercepting a variable portion of the material discharged from the feeding means, and means responsive to the position of said balance beam for gradually varying the portion of the material intercepted by said intermediate means in accordance with the weight of material deposited in the container.

2. An automatic weighing device comprising a pivotally supported substantially straight rigid balance beam having a container on one end thereof, means constraining the other end of said balance beam against other than axial movement, a weight variably positionable on said balance beam for balancing material deposited in said container, means for feeding material into said container including a pivotally supported funnel for discharging material into said container, a chute positioned between said funnel and container for intercepting a variable portion of the material discharged from said funnel, and a mechanical linkage between said balance beam and said funnel for gradually changing the position of said funnel relative to said chute in accordance with the position of the balance beam to gradually vary the portion of material discharged from said funnel which is intercepted by said chute in accordance with the weight of material deposited in the container, including a link having one end rigidly secured to said balance beam, and a second link having one end pivotally connected to the discharge end of said funnel, said links being pivotally connected together at the other end thereof.

3. An automatic weighing device comprising a spring steel resilient torsion band, a balance beam supported by said torsion band having a container on one end thereof, means constraining the other end of said balance beam against other than axial movement, a weight variably positionable on said balance beam between said other end and the pivot support therefor for balancing material deposited in said container, a second spring steel resilient torsion band and a funnel for feeding material into said container supported on said second torsion band, a chute positioned between said funnel and container for intercepting a variable portion of the material discharged from said funnel, and a mechanical linkage between said balance beam and said funnel for gradually changing the position of said funnel relative to said chute in accordance with the position of the balance beam to gradually vary the portion of material discharged from said funnel which is intercepted by said chute in accordance with the weight of material deposited in the container.

4. An automatic weighing device comprising support means, a substantially straight rigid balance beam, first pivot means mounting the balance beam between the ends of the balance beam on the support means, a container supported on one end of said balance beam for receiving material deposited therein, means limiting movement of the other end of the balance beam to axial movement, a weight carried by and slidable along said balance beam for balancing material deposited in said container, a yoke, means for supporting said yoke above said one end of said balance beam, a funnel, second pivot means for supporting the funnel from said yoke over said container for discharging material deposited in said funnel into said container, chute means positioned between said funnel and container for intercepting a variable portion of the material discharged from said funnel, a rigid link connected to the balance beam for movement therewith in accordance with the position of said weight and the weight of material in said container, means connected to said link and operably associated with said funnel and chute means to vary the relative position thereof in accordance with the movement of said link for gradually increasing the portion of granular material discharged from said funnel intercepted by the chute means as the weight of granular material in the container is increased toward a predetermined weight.

5. Structure as set forth in claim 4 wherein the first pivot means comprises a resilient torsion band rigidly secured at the opposite ends to said support means and rigidly secured centrally to said balance beam.

6. Structure as set forth in claim 4 wherein the second pivot means comprises a resilient torsion band resiliently secured at opposite ends to said yoke and rigidly secured to said funnel between said ends.

7. Structure as set forth in claim 4 wherein the means connected to said link and operably associated with said funnel and chute means to vary the relative position thereof in accordance with the movement of said link comprises an additional rigid link pivotally connected to the funnel at one end and to the first mentioned link at the other end.

8. An automatic weighing device comprising support means, a balance beam, first pivot means mounting the balance beam between the ends of the balance beam on the support means comprising a resilient torsion band rigidly secured at the opposite ends to said support means and rigidly secured centrally to said balance beam, a container supported on one end of said balance beam for receiving material deposited therein, means limiting movement of the other end of the balance beam to axial movement, a weight carried by and slidable along said balance beam between said other end thereof and the first pivot means for balancing material deposited in said container, a yoke, means for supporting said yoke above said one end of said balance beam, a funnel, second pivot means for supporting the funnel from said yoke over said container for discharging material deposited in said funnel into said container comprising a second resilient torsion band rigidly secured at opposite ends to said yoke and rigidly secured to said funnel between said ends, chute means positioned between said funnel and container for intercepting a variable portion of the material discharged from said funnel, a rigid link connected to the balance beam for movement therewith in accordance with the position of said weight and the weight of material in said container, means connected to said link and operably associated with said funnel, and chute means to vary the relative position thereof in accordance with the movement of said link for gradually increasing the portion of granular material discharged from said funnel intercepted by the chute means as the weight of granular material in the container is increased toward a predetermined weight.

9. The structure as set forth in claim 8 wherein the means limiting movement of the other end of the balance beam to axial movement comprises a support having an opening therethrough, through which said other end of the balance beam extends for axial reciprocal movement.

10. An automatic weighing device comprising a resilient torsion band, a substantially straight rigid balance beam pivotally supported centrally by said torsion band and having a container supported on one end thereof, means constraining the other end of said balance beam against other than axial movement, a weight linearly variably positionable on said balance beam for balancing material deposited in said container, a pivotally mounted funnel for feeding material into said container, a chute positioned between said funnel and container for intercepting a variable portion of the material discharged from said funnel, and a linkage between said balance beam and said funnel for gradually changing the relative position of said funnel and said chute in accordance with the deformation of the balance beam to gradually vary the portion of material discharged from said funnel which is intercepted by said chute in accordance with the weight of material deposited in the container.

References Cited in the file of this patent

UNITED STATES PATENTS

| | | | |
|---|---|---|---|
| 110,965 | Fairbanks | Jan. 17, | 1871 |
| 129,222 | Hamacher | July 16, | 1872 |
| 299,761 | Du Brul | June 3, | 1884 |
| 340,012 | Springer | Apr. 13, | 1886 |
| 364,407 | Gladish | June 7, | 1887 |
| 677,213 | Hoepner | June 25, | 1901 |
| 694,487 | Lottridge | Mar. 4, | 1902 |
| 772,446 | Weyant | Oct. 18, | 1904 |
| 793,116 | Weyant | June 27, | 1905 |
| 1,009,826 | Brooke | Nov. 28, | 1911 |
| 1,019,323 | Hefter | Mar. 5, | 1912 |
| 1,336,705 | Leumann | Apr. 13, | 1920 |
| 1,599,529 | Hoffer | Sept. 14, | 1926 |
| 2,625,361 | Schrock | Jan. 13, | 1953 |
| 2,850,255 | Gould | Sept. 2, | 1958 |
| 2,919,100 | Rush | Dec. 29, | 1958 |
| 2,926,010 | Kennaway et al. | Feb. 23, | 1960 |

FOREIGN PATENTS

| | | | |
|---|---|---|---|
| 787,675 | France | July 8, | 1935 |
| 867,074 | Germany | Feb. 16, | 1953 |